US011103965B2

(12) United States Patent
Mueller

(10) Patent No.: US 11,103,965 B2
(45) Date of Patent: Aug. 31, 2021

(54) METHOD FOR PRODUCING A CURVED TUBULAR CONNECTION ELEMENT

(71) Applicant: EISELE PNEUMATICS GMBH & CO. KG, Waiblingen (DE)

(72) Inventor: Bernhard Mueller, Leutenbach (DE)

(73) Assignee: EISELE PNEUMATICS GMBH & CO. KG, Waiblingen (DE)

( * ) Notice: Subject to any disclaimer, the term of this patent is extended or adjusted under 35 U.S.C. 154(b) by 199 days.

(21) Appl. No.: 16/097,651

(22) PCT Filed: Mar. 29, 2017

(86) PCT No.: PCT/EP2017/000383
§ 371 (c)(1),
(2) Date: Oct. 30, 2018

(87) PCT Pub. No.: WO2017/190823
PCT Pub. Date: Nov. 9, 2017

(65) Prior Publication Data
US 2019/0134763 A1 May 9, 2019

(30) Foreign Application Priority Data
May 2, 2016 (DE) ...................... 10 2016 005 299.6

(51) Int. Cl.
*B23P 15/00* (2006.01)
*B21D 7/02* (2006.01)
(Continued)

(52) U.S. Cl.
CPC ................ *B23P 15/00* (2013.01); *B21D 7/02* (2013.01); *F16L 37/091* (2013.01); *F16L 43/001* (2013.01)

(58) Field of Classification Search
CPC .......... B23P 15/00; B21D 7/02; F16L 37/091; F16L 43/001
(Continued)

(56) References Cited

U.S. PATENT DOCUMENTS 1,826,077 A * 10/1931 Johnson .................. B21C 37/30
72/296
1,913,490 A * 6/1933 Kepler .................. B21C 37/283
29/890.149
(Continued)

FOREIGN PATENT DOCUMENTS

| AT | 179463 | 9/1954 |
| CN | 204677966 | 9/2015 |

(Continued)

OTHER PUBLICATIONS

International Search Report (ISR) dated Jun. 8, 2017 in International (PCT) Application No. PCT/EP2017/000383.

*Primary Examiner* — Lawrence Averick
(74) *Attorney, Agent, or Firm* — Wenderoth, Lind & Ponack, L.L.P.

(57) ABSTRACT

A method for producing a curved tubular connection element has at least the following production steps: machining a linearly extending metal tube piece (10) with a specifiable length while incorporating connection geometries (12, 14) for receiving separate connection parts (18, 20) to connect a media-conducting piping; carrying out a bending process for the tube piece (10) produced by being machined with a specifiable bending radius, preferably up to 90 degrees; and attaching each connection part (18, 20) to the respective connection geometry (12, 14) that can be paired with it.

9 Claims, 2 Drawing Sheets

(51) Int. Cl.
*F16L 43/00* (2006.01)
*F16L 37/091* (2006.01)

(58) Field of Classification Search
USPC .................................................. 29/890.149
See application file for complete search history.

(56) References Cited

U.S. PATENT DOCUMENTS

| | | | | |
|---|---|---|---|---|
| 2,002,282 | A * | 5/1935 | Tessky | B23B 13/126 82/164 |
| 2,983,995 | A * | 5/1961 | Gresse | B21C 37/283 29/890.147 |
| 2,988,385 | A | 6/1961 | Foelster et al. | |
| 3,055,396 | A * | 9/1962 | Koch | F15B 1/24 138/31 |
| 3,243,873 | A * | 4/1966 | Steel | B21D 9/073 29/890.149 |
| 3,752,506 | A * | 8/1973 | Fouts | F16L 27/0816 285/222.1 |
| 5,718,461 | A * | 2/1998 | Esser | B65G 53/523 285/179 |
| 6,450,550 | B1 * | 9/2002 | Cornwell | F16L 19/0283 285/340 |
| 6,473,981 | B2 * | 11/2002 | Dole | B21D 17/04 33/529 |
| 6,591,915 | B2 * | 7/2003 | Burris | E21B 34/063 166/317 |
| 6,951,354 | B1 * | 10/2005 | Paulson | B65G 53/523 285/179 |
| 7,300,074 | B1 * | 11/2007 | Paulson | B65G 53/523 285/179 |
| 8,870,235 | B2 | 10/2014 | Turk | |
| 9,132,133 | B2 * | 9/2015 | Patel | A61K 31/439 |
| 9,634,885 | B2 * | 4/2017 | Sonoda | H04L 45/28 |
| 9,789,527 | B2 * | 10/2017 | Keller | B21D 7/063 |
| 9,829,124 | B2 * | 11/2017 | Dill | F16L 9/18 |
| 10,047,884 | B2 * | 8/2018 | Taylor | F16L 33/224 |
| 10,799,608 | B2 * | 10/2020 | Long | A61L 2/183 |
| 2002/0112359 | A1 * | 8/2002 | Dole | B21H 7/182 33/555.1 |
| 2008/0191470 | A1 * | 8/2008 | Esser | F16L 43/007 285/179 |
| 2013/0174935 | A1 | 7/2013 | Patterson, II et al. | |
| 2015/0085642 | A1 * | 3/2015 | Sonoda | H04L 41/0654 370/225 |
| 2015/0174133 | A1 * | 6/2015 | Patel | A61K 45/06 514/195 |
| 2015/0369400 | A1 * | 12/2015 | Dill | F16L 9/18 138/147 |
| 2016/0230911 | A1 * | 8/2016 | Taylor | F16L 19/086 |
| 2017/0066026 | A1 * | 3/2017 | Keller | B21D 7/02 |
| 2017/0173198 | A1 * | 6/2017 | Long | C01B 13/11 |

FOREIGN PATENT DOCUMENTS

| | | |
|---|---|---|
| CN | 205136913 | 4/2016 |
| DE | 630724 | 6/1936 |
| DE | 27 14 782 | 10/1978 |
| DE | 40 15 151 | 11/1991 |
| DE | 90 07 807 | 1/1997 |
| DE | 297 02 916 | 5/1997 |
| DE | 10 2007 016 766 | 3/2008 |
| DE | 20 2007 019 321 | 11/2011 |
| DE | 10 2012 111 803 | 6/2014 |
| JP | 4-17923 | 1/1992 |
| JP | 2007-331021 | 12/2007 |

* cited by examiner

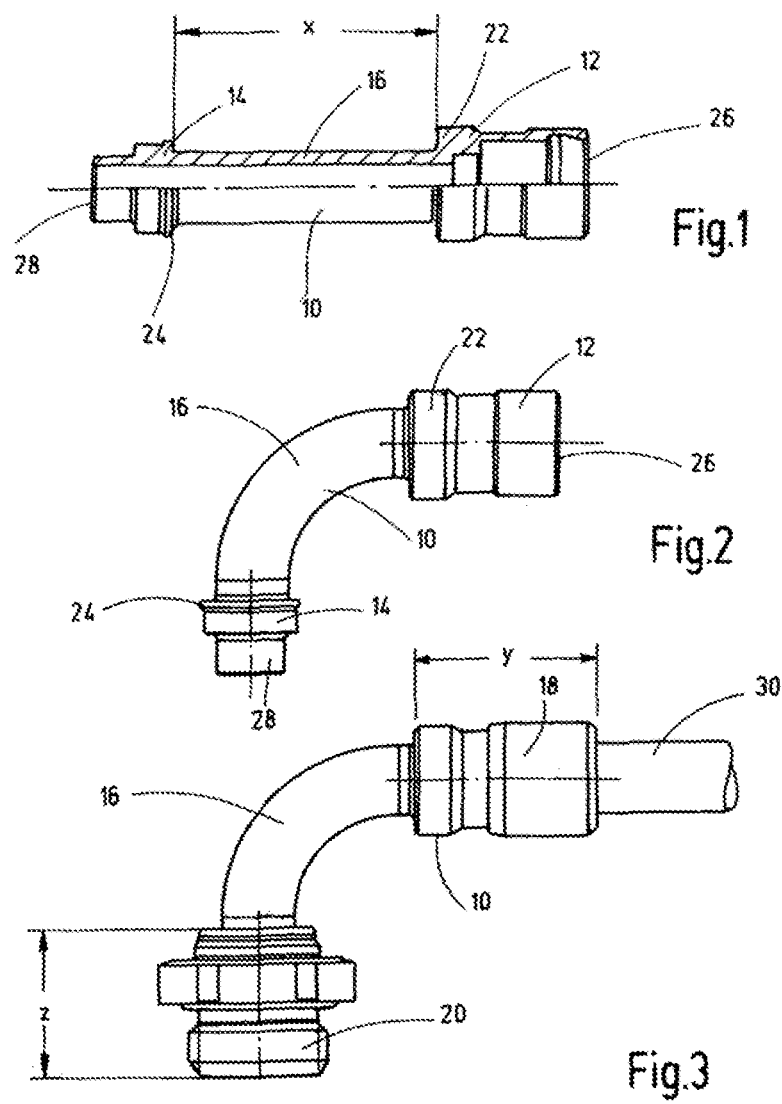

METHOD FOR PRODUCING A CURVED TUBULAR CONNECTION ELEMENT

FIELD OF THE INVENTION

The invention relates to a method for producing a bent tubular connection element.

BACKGROUND OF THE INVENTION

DE 10 2007 016 766 A1 discloses a device for injection molding pipe elbows having bent sections with a circular arc-shaped centerline and a constant internal cross-section. Cylindrical connection nozzles adjoin on both sides. A multi-part injection mold of a permanent mold of outer moldings and core parts can be divided into at least two outer mold parts in the plane of the circular arc-shaped center line of the manifold section. Outer mold parts form a mold cavity. The permanent mold comprises the at least three movable core parts.

A disadvantage of the relevant prior art is that a separate injection mold has to be manufactured for every shape of a pipe bend and for every bending radius of the pipe elbow, which is expensive and entails high production cost.

DE 27 14 782 A1 discloses a method for the manufacture of pipe elbows, in particular made of thin-walled material. A straight pipe section is stretch-pressed over a stretching device such that the original wall thickness of the pipe section is variably reduced over the circumference of the pipe. The straight pipe section, due to the varying material stretching, is deformed into a pipe elbow whose neutral fibers, in which the original wall thickness is maintained, are located in the inner pipe bend.

In the known solution, soft-soldered, brazed or welded, spot-welded, beaded and seamlessly drawn pipe sections are used for the actual bending process. Depending on the desired shape of the bend, elongations up to 180% and reductions in wall thickness of up to 60% of the material used for the pipe elbow occur. Due to the at least partial reduction of the original wall thickness of the initially rectilinear pipe section during the bending process, an overall weakening of the input material occurs. As a result, the relevant solution is not suitable for high-pressure applications.

SUMMARY OF THE INVENTION

Based on this prior art, the invention addresses the problem of providing a method such that a bent tubular connection element, which is also suitable for high-pressure applications, is obtained at low production costs and reduced manufacturing effort.

A method according to the invention solves this problem by the method having the following manufacturing steps.
  Performing a machining operation for a metallic, rectilinear pipe section of predeterminable length, including connection geometries for receiving separate fittings to connect media-carrying pipework;
  Performing a bending process for the pipe section machined having a predetermined bending radius, preferably of up to 90 degrees; and
  Mounting the respective fitting to the assignable connection geometry at the end of the pipe section, preferably by beading, pressing, welding, screwing or clamping.

A pressure-resistant pipe elbow or bending tube as a connection element in the context of a connection pipework can then be achieved at low cost and manufacturing effort.

Because in the initial state, a rectilinear pipe section including its connection geometries is achieved by machining, in particular by lathing, a constant pipe wall thickness is achieved in the connecting region of interest where the fittings are located. Also, after the bending process due to the machining of the pipe section, relatively thin wall thicknesses can be implemented in the area of the connection geometries, which are still sufficient to subject the connector to high pressure applications.

The main advantage of the arc-type design is the increased flow rate at the identical cross-section and correspondingly reduced flow resistance values of the media compared to corner angles or for hollow screws (about 20 to 30%) and compared to other bent connections, where cross-sectional constrictions must occur due to production and assembly methods. Furthermore, the method solution according to the invention and the resulting bent piece can be implemented in a cost-effective manner.

Furthermore, a stretching mandrel device, as shown by way of example in DE 27 14 782 A1, can preferably be used to achieve a plurality of different, freely selectable bending radii for the tubular connection element using only one single production device. This device is superior to injection molding where a separate mold is required for every individual bending radius of a bent pipe section or pipe elbow produced and results in a significant cost reduction.

In addition, the bending process for the pipe section may be a cold forming process. Embrittlement of the input material for the initially machined pipe section is prevented, which in turn adds to the high-pressure resistance.

As the connection geometries can be produced by machining before the actual bending process to achieve the bent connecting piece or pipe elbow, an increased variability is created in this respect as well. A multiplicity of different fittings can be attached to standardized connection geometries for the purpose of a subsequent connection of the connection element to an existing pipework, which may have a fixed or flexible hose as part of the existing pipework, for example in the shape of a pneumatic distribution system. Overall, the method for producing the connection element and the connection element itself accomplish a partially modular approach permitting a multiplicity of implementation options in the context of the aforementioned media or fluid-conducting connection technology. This system is without parallel in the prior art.

A connector manufactured based on the method is also the subject matter of the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure that are schematic and not to scale:

FIG. 1 is a front view, partially in section, of a rectilinear pipe section of predeterminable length having connection geometries arranged at the end;

FIG. 2. is a front view of the pipe section of FIG. 1 bent by 90°;

FIG. 3. is a front view of the bent pipe section according to FIG. 2, including attached fittings and a partially shown hose;

DETAILED DESCRIPTION OF THE INVENTION

Figure 4:
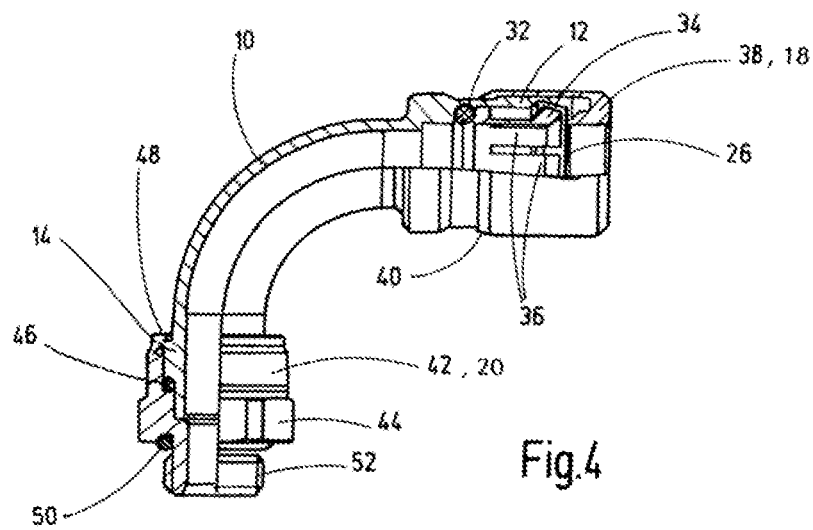
FIG. 4. is a front view, partly in section, of the bent pipe section with the attached fitting according to FIG. 3, but without the inserted hose.

FIG. 1 shows, partially in longitudinal section and partially in front view, a rectilinear pipe section 10 of predeterminable length having connection geometries 12, 14 arranged at the opposite longitudinal ends. The pipe section 10 is formed of a conventional metal material and is preferably achieved by lathing in a machining manner from the solid metal material. Except for the connection geometry 12, the pipe section 10 has a constant inner diameter. If reference is made to a high-pressure resistant design, this includes normal-pressure resistant applications. In particular in the case of the pneumatic applications mentioned below, the pressure values to be controlled regularly amount to up to 24 bar.

FIG. 2 shows the pipe section 10 of FIG. 1 in the bent state. The bend in this case is 90°. Consequently, the two connection geometries 12, 14 at the two opposite end areas of the rectilinear pipe section 10 receive between them a pipe segment 16 having a constant outer diameter. Pipe segment 16 is bent and, in the bending process as shown in FIG. 2, is centrally provided with the largest curvature. As FIG. 1 further shows, both connection geometries 12, 14 are designed different from one another from a machining point of view in order to be able to accommodate different fittings 18, 20 according to the illustration of FIG. 3 et seq. To receive such fittings 18, 20, provision is made that two flange-shaped widenings 22, 24 of the connection geometries 12 and 14 adjoin the pipe segment 16 of the pipe section 10 having a constant diameter on both sides, which widenings are formed as the widest points of the connection geometries. The diameter of each connection geometry 12, 14 is reduced towards the free end 26, 28 of the pipe section 10, with respect to this widest point 26 or 28.

As the illustration of FIG. 3 shows, the respective assignable fitting 18 and 20 is then set onto the connection geometry 12, 14 of the pipe section 10 according to FIGS. 1 and 2 and connected to the pipe section 10 and its connection geometries 12 and 14, respectively. The relevant fittings 18, 20 serve amongst others the inclusion of hoses 30, which are preferably designed as pneumatic hoses being part of a pipework of a pneumatic distribution network (not shown). The pertinent hoses can be made of flexible plastic and are resistant to high pressure like the pipe section 10. In addition to a pneumatic guide, it can also be used to transport other media, such as hydraulic fluids. If required, also pasty media can be conveyed. In particular, the assignable tube pieces 30 can be attached in a detachable manner to the bent tube section 10 according to FIG. 3 using the fittings 18, 20, which will be explained in more detail below with reference to FIGS. 4 to 6.

As is further apparent from FIGS. 1 and 3, the tube length X in the bent portion of the pipe section 10, i.e. between the adjacent sides of the two flange-like extensions 22, 24, has been chosen smaller than the sum of the axial installation lengths Y, Z of both fittings 18, 20 at the associated connection geometries 12, 14, the length determination in turn starting at the respective flange-shaped widening 22, 24 of the pipe section 10. The relevant installation length X can also be chosen equal to the sums of the named axial installation lengths Y and Z. In this way, the arc connection is designed very compact. After bending almost no straight cylindrical pipe sections result, as they otherwise exist for other known arc angles, i.e. the arc according to the invention can pass into in the fittings or connecting parts 18, 20 without lips. This arrangement aids an obstacle-free media or fluid management, without any media or fluid particles unintentionally settling at the transition points to the fittings. The ratio of bending radius to pipe diameter is also located in a range at the edge of the technically feasible. The ratio of bending radius to pipe diameter is 12.7/5, and for larger sizes 20.5/7, 21.8/9, 33.9/12.5 and 44.3/30.

Depending on the design of individual fittings, which may also be different from the fittings 18, 20, these fittings can be connected to the corresponding connection geometries of the pipe section 10 using methods other than beading, for instance by pressing, welding or making a clip connection. Furthermore, there is the option of screwing on, which will be explained in more detail in the embodiment of FIGS. 5 and 6.

The fitting 18 shown in FIG. 4 has on the inner peripheral side a shoulder into which an O-sealing ring 32 is attached by clamping as a sealing means or seal. For clamping the O-ring 32, a further clamping insert 34 is provided in the form of a collet whose individual clamping jaws 36 are used to attach the free end of an assignable, inserted hose 30 in the usual way, which is therefore not described in more detail. When inserting the hose 30 in the clamping insert 34, the clamping jaws 36 spread at their end facing the free end 26 of the pipe section 10. Upon insertion of the hose 30, these clamping jaws 36 return to their starting position, shown in FIG. 4, where the hose 30 is clamped. For the clamping insert 34 to remain in the interior of the connection geometry 12, a sleeve part 38 is provided. The inner end of sleeve part 34 abuts the free end face of the clamping insert 34. Its other free end 40 forming an inwardly projecting beaded edge 40 is used to hold the sleeve part 38 in position on the outer peripheral side of the connection geometry 12. If the beaded edge 40 is not attached too firmly to the connection geometry 12, there is also the option of holding the sleeve part 38 rotatably on the connection geometry 12 in the form of a connection nozzle.

At the other end of the pipe section 10, a screw-in part 42 is fixed on the connection geometry 14 using a hexagonal chamfer 44. A sealing means or seal is in the form of a further O-ring 46 arranged in a stepped widening of the connection geometry 14 and is clamped and held in sealing position by the screw-in part 42. In turn, the screw-in part is held in position on the pipe section 10 by a beading edge 48, which extends over the widening 24 of the connection geometry 14. To protect the other O-ring 46, the pertinent beaded connection is fixed. On its free end, the hexagonal chamfer 44 adjoins a further, third O-ring seal 50. A piece of a pneumatic hose, not shown in greater detail, can be connected in a sealing manner to a lower male thread 52 of the screw-in part 42. In this way, a media-carrying connection between the two connection parts 18, 20 and the intermediate pipe section 10 is established.

Figures 5, 6:
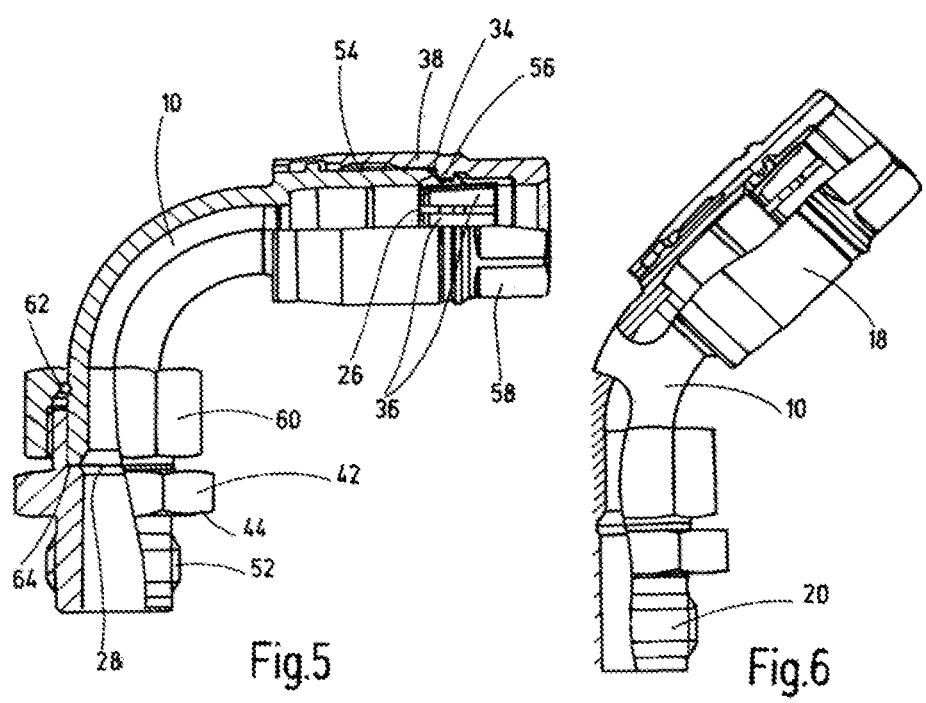
FIG. 5. is a front view, partially in section, of the bent pipe section according to FIG. 2 with different types of fittings as shown above.
FIG. 6. is a front view, partially in section, of a bent pipe section having the same fittings as FIG. 5 but having a shortened pipe section and a different, smaller bending radius of 45°.

The bent tubular connection element according to FIGS. 5 and 6 will be described only insofar as it differs significantly from the preceding embodiment. In the embodiment according to FIG. 5, the sleeve part 38 is designed as a screw-on part, the female thread of which can be screwed onto a male thread 54 of the connection geometry 12. In the relevant screw-on process, an annular tappet web 56 is used to entrain the clamping element of a hose 30 in the form of the collet 34. The individual jaws 36 are controlled by control and guide bevels at the free end 26 of the first connection geometry 12 for an opening and closing operation for attaching the hose 30 not shown in FIG. 5 in an obvious manner. Furthermore, the sleeve part 38 of FIG. 5 has a hexagonal chamfer 58 at its free outer end for the purpose of screwing or rotating movement of the sleeve part 38 by a suitable, actuating tool (open-end wrench), not shown.

The screw-in part 42, which in turn is attached to the lower end of the pipe section 10, this time has a lock nut 60 as a counterpart in addition to the hexagonal chamfer 44. Lock nut 60 can be connected to the screw-in part 42 via assignable female and male threaded sections at the free upper end of the screw-in part and is rotatably supported via a snap ring 62 disposed on the pipe section 10 within the lock nut 60 and in an outer recess of the pipe section 10 so as to be able to conduct the screw-on operation on the male thread of the screw-in part 42 without obstacles. In this way, the screw-in part 42, which likewise has a male thread 52 at its lower free end for the purpose of attaching a screw-on hose 30 (not shown), can be attached to the connection geometry 14 of the pipe section 10. In doing so, viewed towards FIG. 5, the free lower end 28 of the pipe section 10 comes into abutment with an inner step 64 of the screw-in part 42. The embodiment according to FIG. 6 corresponds to the embodiment of FIG. 5 with the proviso that instead of a bending angle of 90°, one of 45° is selected for the pipe section 10.

As a standardized standard part, the connection element according to the invention can be used in a variety of different pipework for transporting media. The individual outer design of the connection element according to the illustrations of FIGS. 3 to 6 illustrates that a substantially closed outer contour is achieved, taking into account the respective fittings 18, 20, such that dirt possibly occurring during operation cannot settle inadvertently on the connection element. If such dirt particles should occur, they can be easily cleaned from the surface of the connection element. In that regard, the connection element according to the invention will preferably be used in the food industry and in the pharmaceutical industry.

While one embodiment has been chosen to illustrate the invention, it will be understood by those skilled in the art that various changes and modifications can be made therein without departing from the scope of the invention as defined in the claims.

The invention claimed is:

1. A method for producing a bent tubular connection element, the method comprising the steps of:
    machining a metallic, rectilinear pipe section of a predeterminable length providing first and second connection geometries on opposite ends of the pipe section, the first and second connection geometries being capable of receiving fittings connectible to media-carrying pipework and having first and second flange widenings, respectively, at a pipe segment of the pipe section, the pipe segment having a constant diameter between the first and second flange widenings, the first and second widenings providing widest points of the first and second connection geometries, every diameter of the first and second connection geometries being reduced relative to the widest points towards free ends of the pipe section;
    bending the pipe section to have a predetermined bend radius; and
    mounting first and second fittings on the first and second connection geometries, respectively.

2. The method according to claim 1 wherein the bend is up to 90 degrees.

3. The method according to claim 1 wherein
    the machining undergoes lathing; and
    the bending is a cold forming process.

4. The method according to claim 1 wherein the pipe section is bent in the pipe segment having a largest curvature in a center thereof.

5. The method according to claim 1 wherein the first and second connection geometries have different structures thereof.

6. The method according to claim 1 wherein the first and second fittings, after being attached to the first and second connection geometries limit, seals at least partially at least one of an outer or inner circumference of the pipe section, the seals being attached by clamping.

7. The method according to claim 6 wherein the seals comprise O-rings.

8. The method according to claim 1 wherein the first and second fittings are fixed or rotatably mounted on the first and second connection geometries, respectively.

9. The method according to claim 1 wherein the first connection geometry comprises a recess on an inner periphery thereof, the recess receiving a collet of the first fitting, the collet being engageable at one end to the pipework.

\* \* \* \* \*